United States Patent
Yoon

(10) Patent No.: US 12,524,008 B2
(45) Date of Patent: Jan. 13, 2026

(54) CONTROLLER DEVICE FOR PERFORMING SOFTWARE PATCH OF POWER SUPPLYING FACILITY, OPERATING METHOD OF CONTROLLER DEVICE, AND SYSTEM INCLUDING CONTROLLER DEVICE

(71) Applicant: SEMES CO., LTD., Cheonan-si (KR)

(72) Inventor: Ki Sub Yoon, Suwon-si (KR)

(73) Assignee: SEMES CO., LTD., Cheonan-si (KR)

( * ) Notice: Subject to any disclaimer, the term of this patent is extended or adjusted under 35 U.S.C. 154(b) by 384 days.

(21) Appl. No.: 18/115,910

(22) Filed: Mar. 1, 2023

(65) Prior Publication Data

US 2023/0315100 A1 Oct. 5, 2023

(30) Foreign Application Priority Data

Mar. 29, 2022 (KR) .......................... 10-2022-0038840

(51) Int. Cl.
  *G05D 1/02* (2020.01)
  *G05D 1/00* (2006.01)
  *G06F 8/65* (2018.01)

(52) U.S. Cl.
  CPC ............. *G05D 1/0212* (2013.01); *G06F 8/65* (2013.01)

(58) Field of Classification Search
  None
  See application file for complete search history.

(56) References Cited

U.S. PATENT DOCUMENTS

| | | | |
|---|---|---|---|
| 6,213,025 B1 * | 4/2001 | Sauerwein | ........... B65G 1/0492 104/282 |
| 9,758,308 B1 * | 9/2017 | Nishikawa | ........ H01L 21/67715 |
| 11,791,186 B2 | 10/2023 | Harasaki | |

(Continued)

FOREIGN PATENT DOCUMENTS

| JP | 2006-313462 | 11/2006 |
|---|---|---|
| JP | 2013-49500 | 3/2013 |

(Continued)

OTHER PUBLICATIONS

Office Action from the Japan Patent Office dated Jul. 18, 2023.
Office Action from the Korean Intellectual Property Office dated Apr. 15, 2024.

*Primary Examiner* — Hua Lu

(57) ABSTRACT

The present disclosure provides controller device for performing software patch of power supplying facility, operating method of controller device, and system including controller device. According to the present disclosure, an operating method of a controller device for performing a software patch of a power supplying facility that supplies power to a transport vehicle in a manufacturing factory is provided. The operating method may include receiving information about the power supplying facility to which the software patch is applied from a manager device, controlling another power supplying facility to supply power to a power supplying section of the power supplying facility, transmitting data for the software patch to the power supplying facility, and controlling a number of transport vehicles to be entered to the power supplying section while the software patch is performed on the power supplying facility.

20 Claims, 10 Drawing Sheets

(56) References Cited

U.S. PATENT DOCUMENTS

| | | | | |
|---|---|---|---|---|
| 2002/0009813 | A1* | 1/2002 | Deguchi | G03F 7/70908 430/30 |
| 2002/0097205 | A1* | 7/2002 | Nakamura | G03F 7/70016 345/82 |
| 2008/0040633 | A1* | 2/2008 | Kasubuchi | G06F 11/0775 714/45 |
| 2008/0134168 | A1* | 6/2008 | Nara | G06F 8/65 717/173 |
| 2009/0150794 | A1* | 6/2009 | Sano | G08C 17/00 715/740 |
| 2010/0122244 | A1* | 5/2010 | Sato | G06F 8/65 717/168 |
| 2010/0249980 | A1* | 9/2010 | Ito | G03F 7/70483 700/121 |
| 2010/0266968 | A1* | 10/2010 | Nakano | G03F 7/70525 355/53 |
| 2010/0298962 | A1* | 11/2010 | Takahashi | G05B 19/0426 700/103 |
| 2011/0032506 | A1* | 2/2011 | Koga | G03F 7/70525 717/171 |
| 2012/0321423 | A1* | 12/2012 | MacKnight | H01L 21/67276 414/664 |
| 2013/0190915 | A1* | 7/2013 | Choo | G05B 19/4189 700/113 |
| 2014/0201209 | A1* | 7/2014 | Hashimoto | A63F 13/95 707/737 |
| 2015/0261645 | A1* | 9/2015 | Tan | G06F 11/323 717/173 |
| 2015/0287621 | A1* | 10/2015 | Xiao | G05B 19/4183 700/108 |
| 2017/0008700 | A1* | 1/2017 | Wada | B61B 3/02 |
| 2017/0195091 | A1* | 7/2017 | Cremer | B61L 23/20 |
| 2018/0131574 | A1* | 5/2018 | Jacobs | H04L 43/0817 |
| 2020/0194292 | A1* | 6/2020 | Ito | H01L 21/67775 |
| 2021/0057250 | A1* | 2/2021 | Harasaki | H01L 21/67733 |
| 2023/0168878 | A1* | 6/2023 | Dayalan | G06F 8/65 717/169 |
| 2023/0191920 | A1* | 6/2023 | Yoon | B60L 58/24 701/22 |
| 2023/0202806 | A1* | 6/2023 | Fukushima | B66C 13/063 212/276 |
| 2023/0322486 | A1* | 10/2023 | Takahara | H01L 21/67703 700/214 |
| 2024/0375866 | A1* | 11/2024 | Yasumoto | B65G 1/0457 |

FOREIGN PATENT DOCUMENTS

| | | |
|---|---|---|
| JP | 2013-538720 | 10/2013 |
| KR | 10-2020-0118152 | 10/2020 |
| KR | 10-2021-0008261 | 1/2021 |

* cited by examiner

CONTROLLER DEVICE FOR PERFORMING SOFTWARE PATCH OF POWER SUPPLYING FACILITY, OPERATING METHOD OF CONTROLLER DEVICE, AND SYSTEM INCLUDING CONTROLLER DEVICE

CROSS-REFERENCE TO RELATED APPLICATION

This Patent Application claims priority to Korean Patent Application No. 10-2022-0038840, filed on Mar. 29, 2022, the entire contents of which are incorporated herein for all purposes by this reference.

BACKGROUND

Field of the Invention

The present disclosure relates to a controller device for performing a software patch of a power supplying facility that supplies power to a transport vehicle in a manufacturing factory, an operating method of the controller device, and a system including the controller device.

Description of the Related Art

A semiconductor manufacturing process is a process in which a final product is manufactured by performing hundreds of processes on a substrate (wafer or glass), and each process may be performed by a manufacturing facility performing a corresponding process. When a process at a specific manufacturing facility is finished, an article (substrate) may be transported to a next manufacturing facility so as to perform a next process, and the article may be stored in a storing facility for a predetermined period. Here, the wafer is stored or transported while being in a state in which the wafer is stored in a transporting container such as a front opening unified pod (FOUP).

As described above, a logistics system of a manufacturing factory refers to a system of transporting and storing the article so as to perform the manufacturing process, and may be divided into a transporting facility transporting the article the and a storing facility storing the article. In the logistics system, an overhead hoist transport (OHT) system traveling along a rail mounted on a ceiling is applied to the manufacturing factory. In the OHT system, a transport vehicle (or the OHT) transports the article by traveling along the rail mounted on the ceiling of the manufacturing factory.

Meanwhile, power for operating the transport vehicle is supplied through a power supplying cable mounted along the rail. Furthermore, current is induced from the power supplying cable to a power receiving apparatus provided on the transport vehicle, so that power is supplied. The power supplying cable is connected to a power supplying facility that is provided at a first side of the manufacturing factory, and the power supplying facility outputs power by adjusting an output voltage and whether power is required to be output based on a command of a higher controller device.

Such a power supplying facility includes a power supplying device supplying power, a computing device (a processor, a memory, an input/output apparatus, and so on) receiving an input for a power supply and performing an operation processing for controlling the power supply, and so on. Furthermore, an operating system for operating a facility and many programs executed in the operating system are stored in the computing device. according to necessity or periodically, a software patch for the operating system or the programs is executed. In this situation, a worker directly moves to the power supplying facility and executes a file for performing the software patch.

SUMMARY

Accordingly, there are problems that a worker's labor is required to perform a manual software patch and a long time is required for performing the software patch.

Accordingly, an objective of an embodiment of the present disclosure is to provide a controller device for performing a software patch of a power supplying facility capable of automatically performing the software patch, an operating method of the controller device, and a system including the controller device.

The problems to be solved of the present disclosure are not limited to those mentioned above, and other problems not mentioned will be clearly understood by those skilled in the art from the following description.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

According to an aspect of the present disclosure, an operating method of a controller device for performing a software patch of a power supplying facility that supplies power to a transport vehicle in a manufacturing factory is provided. The operating method may include receiving information about the power supplying facility to which the software patch is applied from a manager device, controlling another power supplying facility to supply power to a power supplying section of the power supplying facility, transmitting data for the software patch to the power supplying facility, and controlling a number of transport vehicles to be entered to the power supplying section while the software patch is performed on the power supplying facility.

According to an embodiment of the present disclosure, the operation of controlling the number of transport vehicles to be entered to the power receiving section may include controlling another power supplying facility to supply power to a power supplying section of the power supplying facility.

According to an embodiment of the present disclosure, the operation of controlling the number of transport vehicles to be entered to the power receiving section may include identifying a transport vehicle entering the power supplying section, comparing the number of the transport vehicles being positioned at the power supplying section and a threshold number, allowing the transport vehicle to enter the power supplying section when the number of the transport vehicles being positioned at the power supplying section is less than the threshold number, and controlling the transport vehicle to detour to a section other than the power supplying section when the number of the transport vehicles to be positioned at the power supplying section is equal to or greater than the threshold number.

According to an embodiment of the present disclosure, the operating method may further include receiving information about a progress situation of the software patch from the power supplying facility.

According to an embodiment of the present disclosure, the operating method may further include transmitting the information about the progress situation of the software patch to the manager device.

According to an embodiment of the present disclosure, the manager device may be configured to display a progress rate of the software patch and a section in which the software patch is in progress based on the information about the progress situation of the software patch received from the controller device.

According to an embodiment of the present disclosure, in a map screen illustrating a transporting route of the manufacturing factory, the manager device may be configured to display a user interface including a first section in which the software patch is expected to be progressed, a second section in which the software patch is in progress, and a third section in which the software patch is completed in different colors.

In an aspect of the present disclosure, a controller device for performing a software patch of a power supplying facility that supplies power to a transport vehicle in a manufacturing factory is provided. The controller devices may include a transceiver and a processor operatively coupled to the transceiver. The transceiver may be configured to receive information about the power supplying facility to which the software patch is applied from a manager device, and transmit data for the software patch to the power supplying facility. The processor may be configured to control another power supplying facility to supply power to a power supplying section of the power supplying facility, and control a number of the transport vehicles entering the power supplying section while the software patch is performed on the power supplying facility.

In an aspect of the present disclosure, a system for performing a software patch of a power supplying facility that supplies power to a transport vehicle in a manufacturing factory is provided. The system may include a manager device configured to receive an input for managing a logistics system of the manufacturing factory, the manager device being configured to output information for managing the logistics system, and a controller device configured to control the power supplying facility which supplies power to the transport vehicle that transport an article in the manufacturing factory. The controller devices may include a transceiver and a processor operatively coupled to the transceiver. The transceiver may be configured to receive information about the power supplying facility to which the software patch is applied from a manager device, and transmit data for the software patch to the power supplying facility. The processor may be configured to control another power supplying facility to supply power to a power supplying section of the power supplying facility, and control a number of the transport vehicles entering the power supplying section while the software patch is performed on the power supplying facility.

According to the present disclosure, since data and a command for performing the software patch are transmitted to the power supplying facility through the controller device, the software patch of the power supplying facility is capable of being automatically performed.

The effect that can be obtained from the present disclosure is not limited to the above-mentioned effect, and other effects not mentioned herein will be clearly understood by those skilled in the art from the following description.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Figure 1:
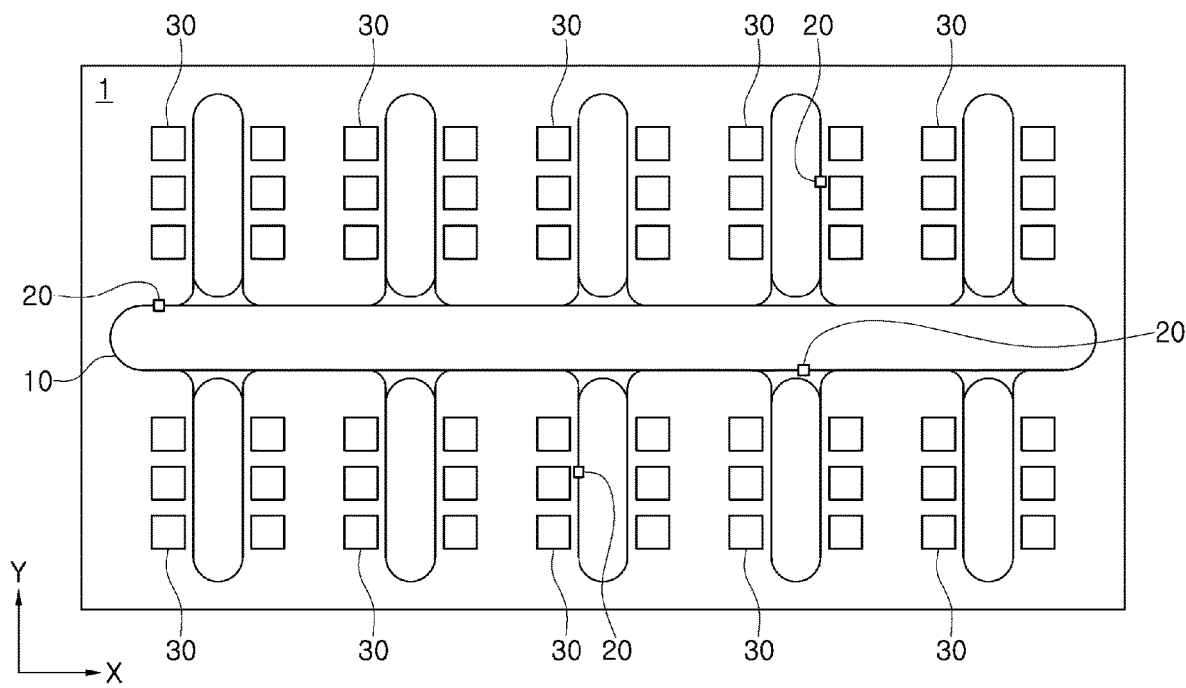
FIG. 1 is a view illustrating a structure of a manufacturing factory to which the present disclosure is capable of being applied.

Hereinafter, exemplary embodiments of the present disclosure will be described in detail with reference to the accompanying drawings so that those skilled in the art can easily implement the present disclosure. The present disclosure is not limited to the exemplary embodiments described herein and may be embodied in many different forms.

In order to clearly describe the present disclosure, parts irrelevant to the description are omitted, and the same reference numerals designate the same or similar components throughout the specification.

In addition, in various exemplary embodiments, components having the same configuration will be described only in representative exemplary embodiments by using the same reference numerals, and in other exemplary embodiments, only configurations different from the representative exemplary embodiments will be described.

Throughout the specification, when a part is said to be "connected (or coupled)" to another part, an expression such as "connected (or coupled)" is intended to include not only "directly connected (or coupled)" but also "indirectly connected (or coupled)" having a different member interposed therebetween. In addition, it will be further understood that when a part "comprises", "includes", or "has" an element, this means that other elements are not excluded but may be further included, unless otherwise stated.

Unless defined otherwise, all terms used herein including technical or scientific terms have the same meanings as generally understood by a person having ordinary knowledge in the art to which the present disclosure pertains. The terms defined in general dictionaries are construed as having meanings consistent with the contextual meanings of the art, but not interpreted as ideal meanings or excessively formal meanings unless explicitly defined in the present application.

Hereinafter, a controller device for performing a software patch of a power supplying facility that is capable of automatically performing the software patch, an operating method of the controller device, and a system including the controller device will be described.

FIG. 1 is a view illustrating a structure of a manufacturing factory 1 to which the present disclosure is capable of being applied. Hereinafter, a semiconductor manufacturing factory in which a semiconductor product is manufactured is described as an example of a manufacturing factory to which the present disclosure is applied. However, a range of the manufacturing factory to which the present disclosure is capable of being applied is not limited to a specific type manufacturing factory, and may be applied to a manufacturing factory in various industrial groups. For example, an article transport system of the present disclosure may be applied to another type manufacturing factory that produces a product such as a display panel, an electronic device, a vehicle, or a secondary battery.

The manufacturing factory 1 includes one or more clean rooms, and manufacturing facilities 30 for performing a semiconductor manufacturing process may be mounted in each of the clean rooms. Generally, a finally processed substrate may be completely manufactured by repeatedly performing a plurality of manufacturing processes on a substrate (for example, a wafer). When the manufacturing process is completed in the specific manufacturing facility 30, the substrate is transported to the manufacturing facility 30 for performing a subsequent manufacturing process. Here, a wafer may be transported in a state in which the wafer is stored in a transport container (for example, a front opening unified pod (FOUP)) capable of accommodating a plurality of substrates. The transport container in which wafers are stored may be transported by a transport vehicle 20. The transport vehicle 20 may be referred to as an overhead hoist transport (OHT) driving along a traveling rail 10 mounted on a ceiling.

Referring to FIG. 1, the manufacturing facility 30 for performing a process is mounted in the manufacturing factory 1, and the transport vehicle 20 transporting an article between the manufacturing facilities 30 and the traveling rail 10 providing a traveling route of the transport vehicle 20 are provided. Here, when the transport vehicle 20 transports an article between the manufacturing facilities 30, the article may be directly transported to another manufacturing facility 30 from the specific manufacturing facility 30, or may be transported to another manufacturing facility 30 after the article is stored in a stocker facility.

Figure 2:
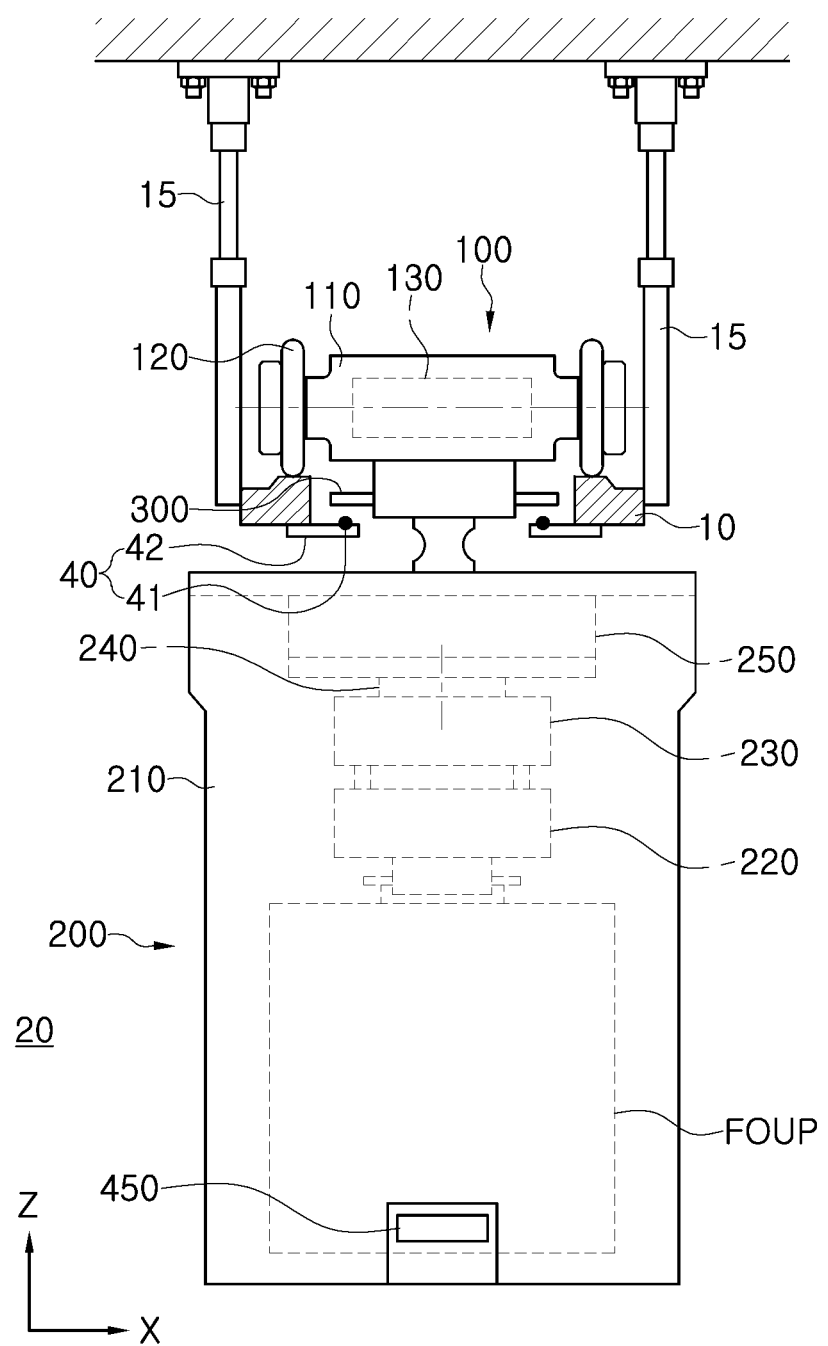
FIG. 2 is a view illustrating a structure of a transport vehicle transporting an article in the manufacturing facility according to the present disclosure.

FIG. 2 is a view illustrating a structure of a transport vehicle transporting an article in the manufacturing facility according to the present disclosure.

Referring to FIG. 2, the traveling rail 10 includes a pair of rail members spaced apart from each other in a horizontal direction and disposed as a pair, and is mounted on the ceiling of the manufacturing factory 1 by rail supports 15. Each of the rail supports 15 may have a lower end portion supporting each of the pair of rail members, and may have an upper end portion fixed to the ceiling of the semiconductor manufacturing factory. The pair of rail members may be formed such that traveling surfaces at upper sides thereof are provided.

As illustrated in FIG. 2, a power supplying apparatus 40 for supplying power to the transport vehicle 20 includes a cable mounting structure 42 mounted at a lower portion of the traveling rail 10, and includes a power supplying cable 41 mounted on the cable mounting structure 42. The power supplying cable 41 induces current to a power receiving apparatus 300 of the transport vehicle 20 providing a driving power.

Referring to FIG. 2, the transport vehicle 20 includes a traveling portion 100 configured to travel along the traveling rail 10, and includes a hoist portion 200 positioned below the traveling portion 100 and configured to support the article. The hoist portion 200 moves together with the traveling portion 100 and transports and loads the article to the manufacturing facility 30.

The traveling portion 100 includes a vehicle body 110 and traveling wheels 120. An axle that extends in left and right directions is mounted on the vehicle body 110. The axle includes a plurality of axles, and the plurality of axles may be spaced apart from each other in front and rear directions. The traveling wheels 120 are wheels that impart mobility to the vehicle body 110 so that the vehicle body 110 may travel by being guided by the traveling rail 10. The traveling wheels 120 are mounted at opposite ends of the axle, and are capable of being rotated while being in contact with upper surfaces of the pair of rails 10. The traveling portion 100 further includes a wheel driving unit 130 configured to provide power for rotating the traveling wheels 120. For example, the wheel driving unit 130 may be configured to rotate the axle.

The hoist portion 200 includes a hoist housing 210. The hoist housing 210 is disposed below the traveling rail 10 and is connected to the traveling portion 100. An upper portion of the hoist housing 210 may be connected to a lower portion of the vehicle body 110 by a single or a plurality of connectors. The hoist housing 210 provides an accommodation space in which the article is accommodated. The hoist housing 210 has a structure opened at left and right sides and a lower side thereof so as to move the article from the accommodation space in the horizontal direction (X-direction) and a downward direction.

Furthermore, the hoist portion 200 further includes a hand unit 220 configured to grip or release the article, and includes a hand moving unit configured to move the hand unit 220 between a first position and a second position. The first position is a position at which the article gripped by the hand unit 220 is accommodated in the accommodation space of the hoist housing 210, and the second position is a position disposed outside the hoist housing 210 and spaced apart from the first position. The hoist portion 200 includes a vertical driving unit 230, a rotation driving unit 240, and a horizontal driving unit 250 as the hand moving unit.

The hand unit 220 may include a hand configured to grip or release the article, and a hand support configured to support the hand. The vertical driving unit 230 moves the hand unit 220 in the vertical direction. The vertical driving unit 230 may move the hand unit 220 in the vertical direction (Z-direction) by winding at least one belt around a drum or unwinding the belt from the drum. The rotation driving unit 240 rotates the hand unit 220 about an axis that extends in the vertical direction, and the horizontal driving unit 250 moves the hand unit 220 in the left and right directions. For example, the vertical driving unit 230 moves the hand unit 220 in the vertical direction, the rotation driving unit 240 rotates the vertical driving unit 230 about the axis that extends in the vertical direction, and the horizontal driving unit 250 moves the rotation driving unit 240 in the left and right directions. Therefore, the article gripped by the hand unit 220 may be moved in the vertical direction, may be rotated about the axis that extends in the vertical direction, or may be moved in the left and right directions.

The present disclosure relates to an operating method of a controller device 600 for performing a software patch of a power supplying facility 800 in a power supplying system for supplying power to the transport vehicle 20. In the present specification, a structure that is the same as FIG. 2 is described as an example of the transport vehicle 20, but a type of the transport vehicle 20 is not limited to the structure that is the same as FIG. 2. Furthermore, the transport vehicle 20 is capable of being applied to any vehicles which travel by using power supplied from the power supplying facility 800 of the manufacturing factory 1 and which transport an article.

Figure 3:
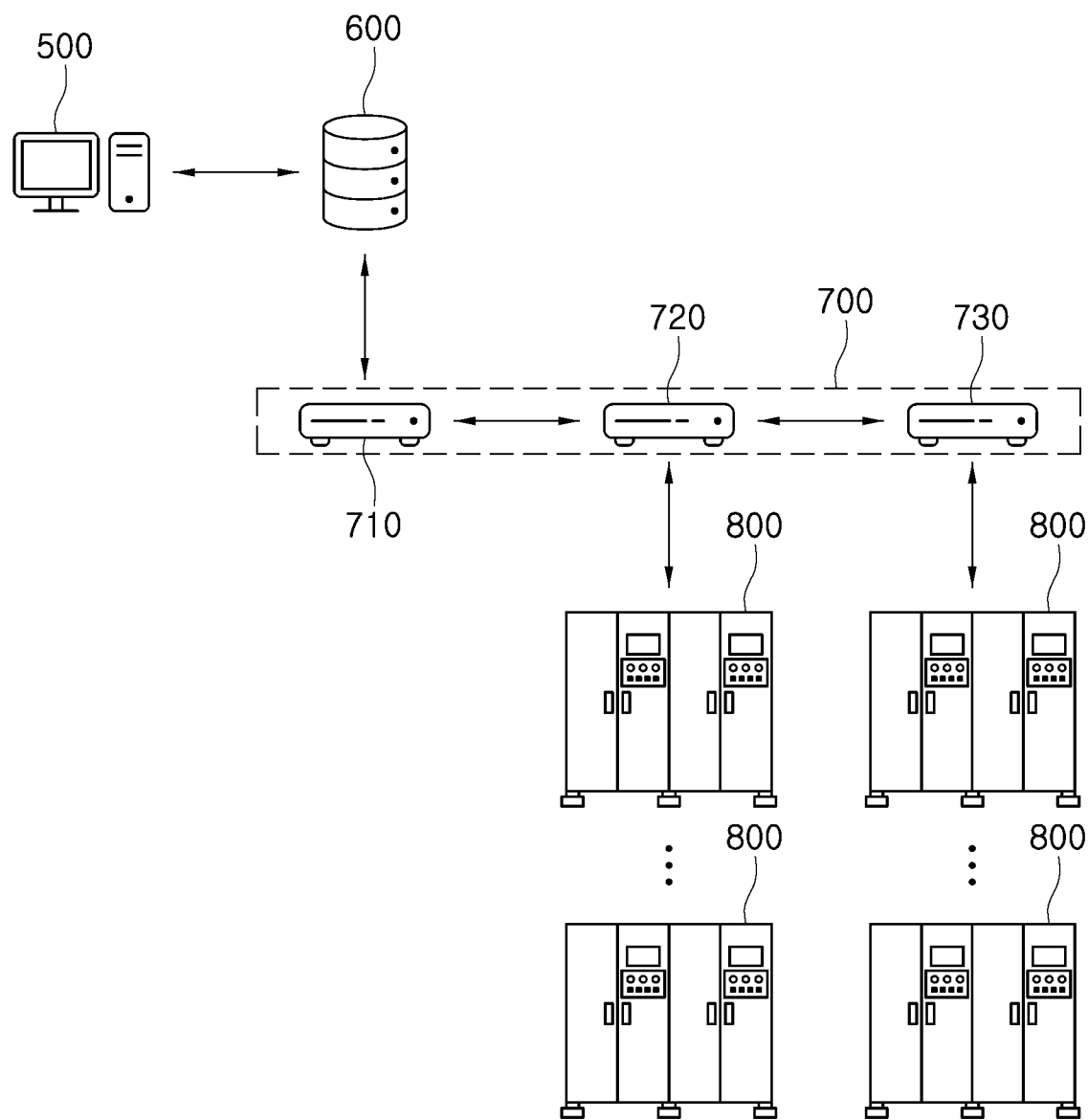
FIG. 3 is a view illustrating a configuration of a power supplying system for supplying power to the transport vehicle from the manufacturing factory according to the present disclosure.

FIG. 3 is a view illustrating a configuration of a power supplying system for supplying power to the transport vehicle 20 from the manufacturing factory 1 according to the present disclosure.

Referring to FIG. 3, in the power supplying system, the power supplying facility 800 for supplying power to the transport vehicle 20 is provided in the manufacturing factory 1, and the power supplying facility 800 applies current for feeding power to the power supplying cable 41 that is mounted along the traveling rail 11. The power supplying facility 800 includes a plurality of power supplying facilities 800, so that an area for supplying power is divided for each power supply facility 800. The power supplying facilities 800 supplying power to an adjacent area may be connected to each other as a group.

Meanwhile, in a group of adjacent power supplying facilities 800, when one power supplying facility 800 is shut down for a reason such as a software patch or a maintenance, power may be supplied to a power supplying section of the power supplying facility 800 being shut down by another power supplying facility 800. As such, a method of supplying power to another power supplying facility 800 other than the original power supplying facility 800 is referred to as a failover.

Each power supply facility 800 includes a computing device and controller circuitry that controls power supplied to the power supply cable 41. The power supply facilities 800 have software programs installed (such as an operating system and application programs) to control the power supply process, which require periodic updates. To update the software, a patch file is installed on each power supply facility 800 to fix bugs or improve the software's functions. During the installation of a software patch, the corresponding power supply facility 800 is shut down, rendering the power receiving area temporarily unavailable to supply power to a transport vehicle (20) located within it. In such cases, failover is required for the power receiving area.

Figure 5:
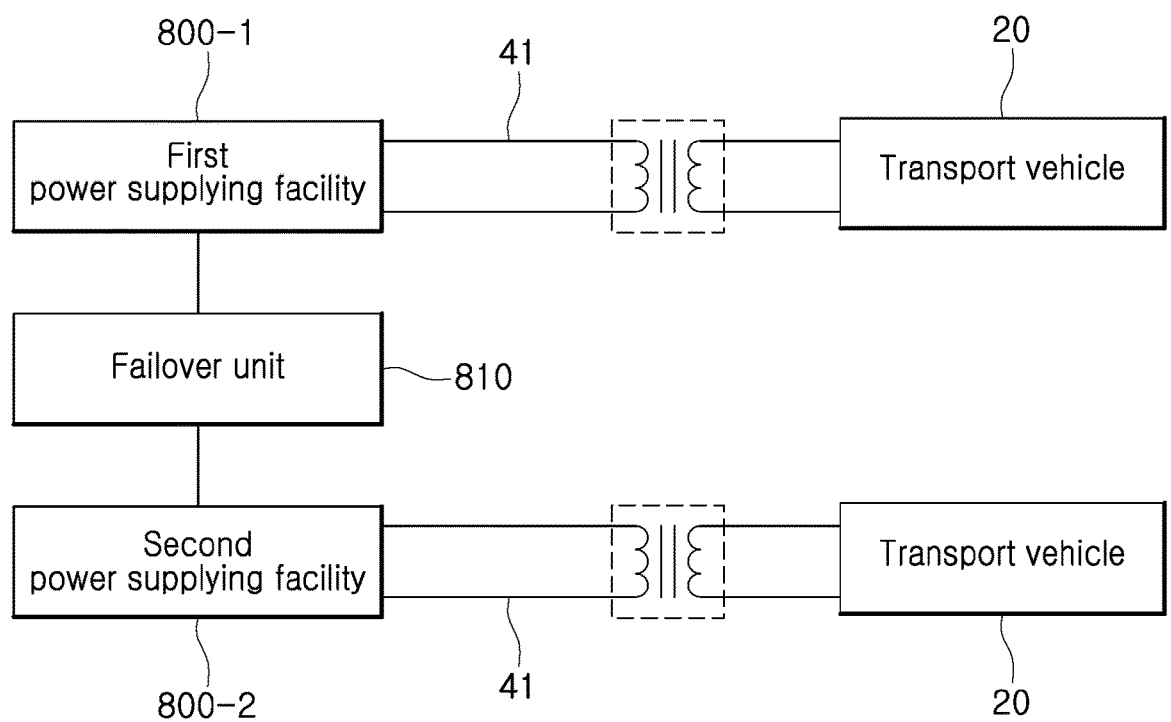
FIG. 5 is a view illustrating a structure in which power is supplied to the transport vehicle from the power supplying facility according to the present disclosure.

Referring to FIG. 5, a first power supplying facility 800-1 and a second power supplying facility 800-2 is connected to each other through a failover unit 810, and the first power supplying facility 800-1 and the second power supplying facility 800-2 supply power to the transport vehicle 20 through the power supplying cable 41. At this time, when a function of the first power supplying facility 800-1 is stopped since a software patch is performed on the first power supplying facility 800-1, the failover unit 810 may turn-on a failover switch (not illustrated) so that the second power supplying facility 800-2 supplies power to a power supplying section of the first power supplying facility 800-1, and vice versa. When the failover function is operated due to the stop of the first power supplying facility 800-1, a threshold number of the transport vehicles 20 that enters the section supplied with power by the second power supplying facility 800-2 is limited.

The power supplying system includes a communication device 700 which provides a communication environment to the group of the power supplying facility 800 and which connects each power supplying facility 800 to a higher network apparatus. The communication device 700 includes a master communication device 710 directly connected to the controller device 600 that controls a transportation, and includes a slave communication device 720 connected to the master communication device 710 and the power supplying facility 800 so that a communication of the power supplying facility 800 is capable of being realized. Generally, the communication device 700 is constituted of a wired network, but may be entirely or partially constituted of a wireless network.

Meanwhile, in the manufacturing factory 1, the controller device 600 controlling the transportation of the article may be configured such that the controller device 600 is connected to the power supplying facility 800 through the communication device 700. The controller device 600 may control the transport vehicle 20 of the manufacturing factory 1 or a lifting apparatus (not illustrated) so as to transport the article. In the present specification, a function of the controller device 600 that performs a controlling operation of the power supplying facility 800 including a software patch of the power supplying facility 800 will be mainly described.

Meanwhile, the controller device 600 is connected to a manager device 500. Furthermore, the controller device 600 may output information about a current article transportation to the manager device 500 or may output information related to a power supply to the manager device 500, and may control the transport vehicle 20 or the power supplying facility 800 according to an input received from the manager device 500. Particularly, according to the present disclosure, an input for a software patch of the power supplying facility 800 is received from the manager device 500, and the software patch of the power supplying facility 800 is capable of being performed remotely.

In the manufacturing factory 1 according to the present disclosure, a system for performing a software patch of the power supplying facility 800 that supplies power to the transport vehicle 20 includes the manager device 500 which receives an input for managing a logistics system of the manufacturing factory 1 and which outputs information for managing the logistics system, and includes the controller device 600 controlling the power supplying facility 800 that supplies power to the transport vehicle 20 transporting the article in the manufacturing factory 1.

Figure 4:
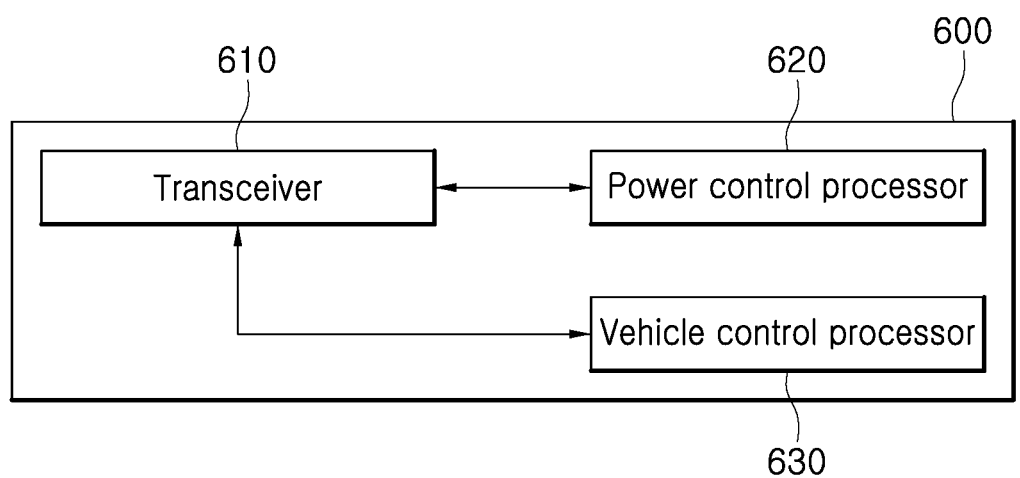
FIG. 4 is a view illustrating a configuration of a controller device for performing a software patch of a power supplying facility that supplies power to the transport vehicle in the manufacturing factory according to the present disclosure.

As illustrated in FIG. 4, the controller device 600 includes a transceiver 610 which receives information about the power supplying facility 800 to which the software patch is applied from the manager device 500 and which transmits data for the software patch and a command for applying the software patch to the power supplying facility 800, a power control processor 620 configured to control such that power is supplied to a power supplying section of the power supplying facility 800 by another power supplying facility, and a vehicle control processor 630 configured to control the number of transport vehicles 20 which enter the power supplying section while the software patch is performed on the power supplying facility 800.

The transceiver 610 may include a modem and an interface module that are for performing a data processing for data exchange with the manager device 500. Meanwhile, the transceiver 610 may perform a function to communicate with the manager device 500 as well as with the communication device 700. Meanwhile, the transceiver 610 is connected to the power control processor 620 or the vehicle control processor 630, so that the transceiver 610 may exchange data for supplying power or for controlling an operation of the transport vehicle 20. For example, the transceiver 610 may receive an input related to a power supply from the manager device 500, and may transmit the received information to the power control processor 620. Otherwise, the transceiver 610 may receive a signal for a power supply from the power control processor 620, and may transmit the signal to the power supplying facility 800. In addition, the transceiver 610 may receive an input for a control of the transport vehicle 20 from the manager device 500, and may transmit the input to the vehicle control processor 630. Otherwise, the signal the control of the transport vehicle 20 transmitted from the vehicle control processor 630 may be transmitted to the transport vehicle 20.

In FIG. 4, the power control processor 620 and the vehicle control processor 630 are configured as separate modules, but the power control processor 620 and the vehicle control processor 630 may be integrated and configured as one module. That is, the control of the power supply and the control of the transport vehicle 20 may be performed by one module, and the controller device 600 may include a control circuit such as a processor or a micro controller. The power control processor 620 and the power control processor 620 are implemented as a processor which is operatively coupled to the transceiver 610.

Figure 6:
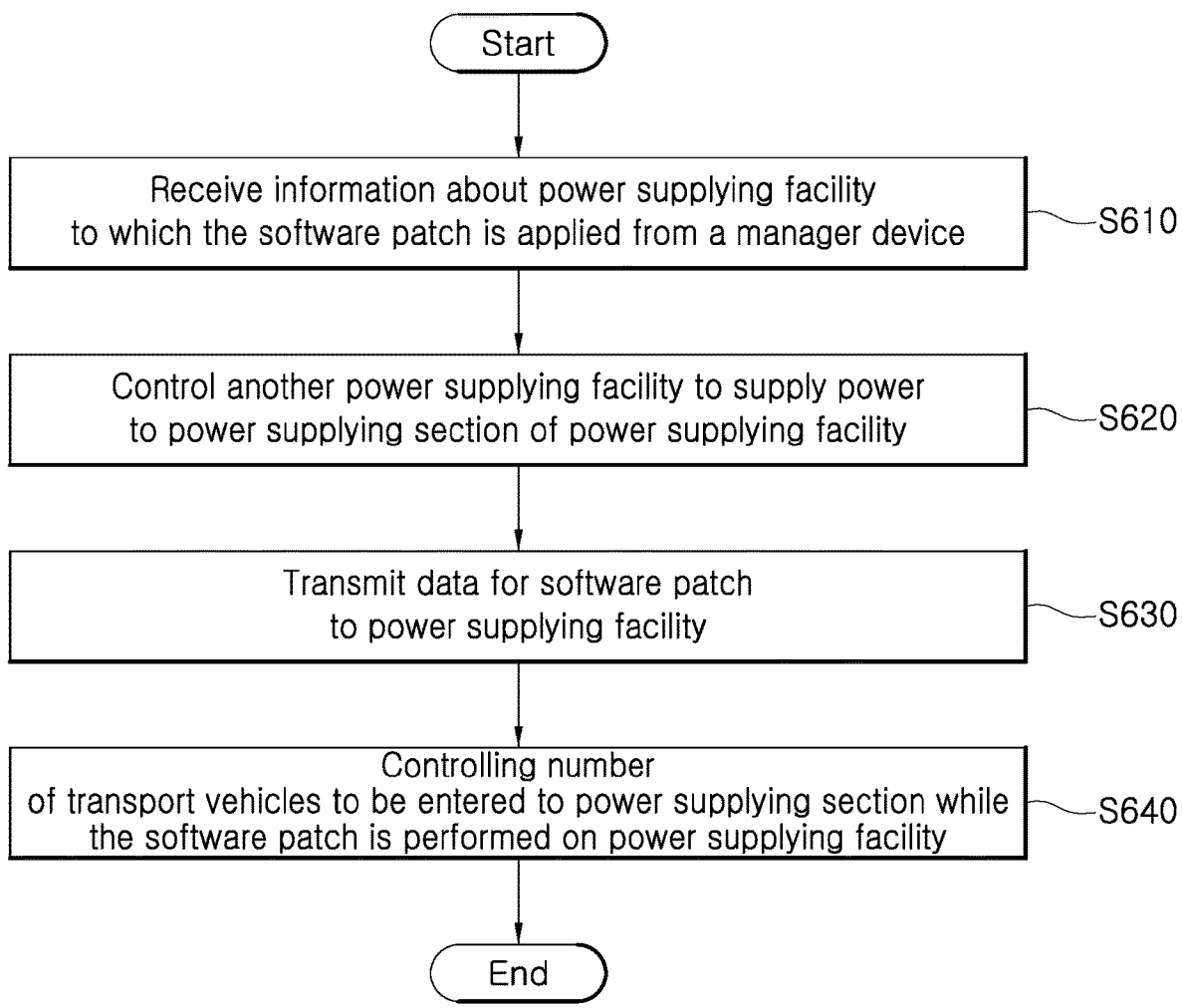
FIG. 6 is a flowchart illustrating an operating method of the controller device for performing the software patch of the power supplying facility that supplies power to the transport vehicle in the manufacturing factory according to the present disclosure.

FIG. 6 is a flowchart illustrating the operating method of the controller device 600 for performing the software patch of the power supplying facility 800 that supplies power to the transport vehicle 20 in the manufacturing factory 1 according to the present disclosure.

In the operating method of the controller device 600 for performing the software patch of the power supplying facility 800 that supplies power to the transport vehicle 20 in the manufacturing factory 1 according to the present disclosure, the operating method includes receiving information about the power supplying facility 800 to which the software patch is applied from a manager device (S610), controlling another power supplying facility to supply power to a power supplying section of the power supplying facility 800 (S620), transmitting data for the software patch to the power supplying facility 800 (S630), and controlling a number of transport vehicles 20 to be entered to the power supplying section while the software patch is performed on the power supplying facility 800.

According to the present disclosure, a method in which a worker directly moves to the power supplying facility 800 and executes a software patch such as a conventional technology is not applied, and a software patch is remotely transmitted to the power supplying facility 800 through the controller device 600, so that an operation of the worker may be reduced and the software patch is capable of being rapidly performed.

In addition, since the failover function that is required during the automatic software patch process and the entry control of the transport vehicle 20 are performed together, the power supply to the transport vehicle 20 may be smoothly performed, and a situation in which the power supply is stopped or an abnormality occurs in the power supplying facility 800 may be prevented.

In the operation of S610 in which information about the power supplying facility 800 to which the software patch is applied is received from the manager device 500, the transceiver 610 receives information about the power supplying facility 800 to which the software patch is applied from the manager device 500. The transceiver 610 may transmit the received information about the power supplying facility 800 to which the software patch is applied to the power control processor 620. By a signal input to the manager device 500 by the worker or by a signal received to the manager device 500 by an external apparatus, information about the software patch of the specific power supplying facility 800 or the entire of power supplying facilities 800 may be transmitted to the controller device 600. Information about the power supplying facility 800 to which the software patch is applied may include an identifier (ID), a model, and a version of a patch to be applied. In addition, together with information about the patch, file data for the patch may also be transmitted to the manager device 500.

In the operation S620 in which power is supplied by another power supplying facility 800, the power control processor 620 controls the failover unit 810 in FIG. 5 so that the transport vehicle 20 positioned at a power supplying section of the power supplying facility 800 to which the software patch is performed receives power from another power supplying facility 800.

Figure 7:
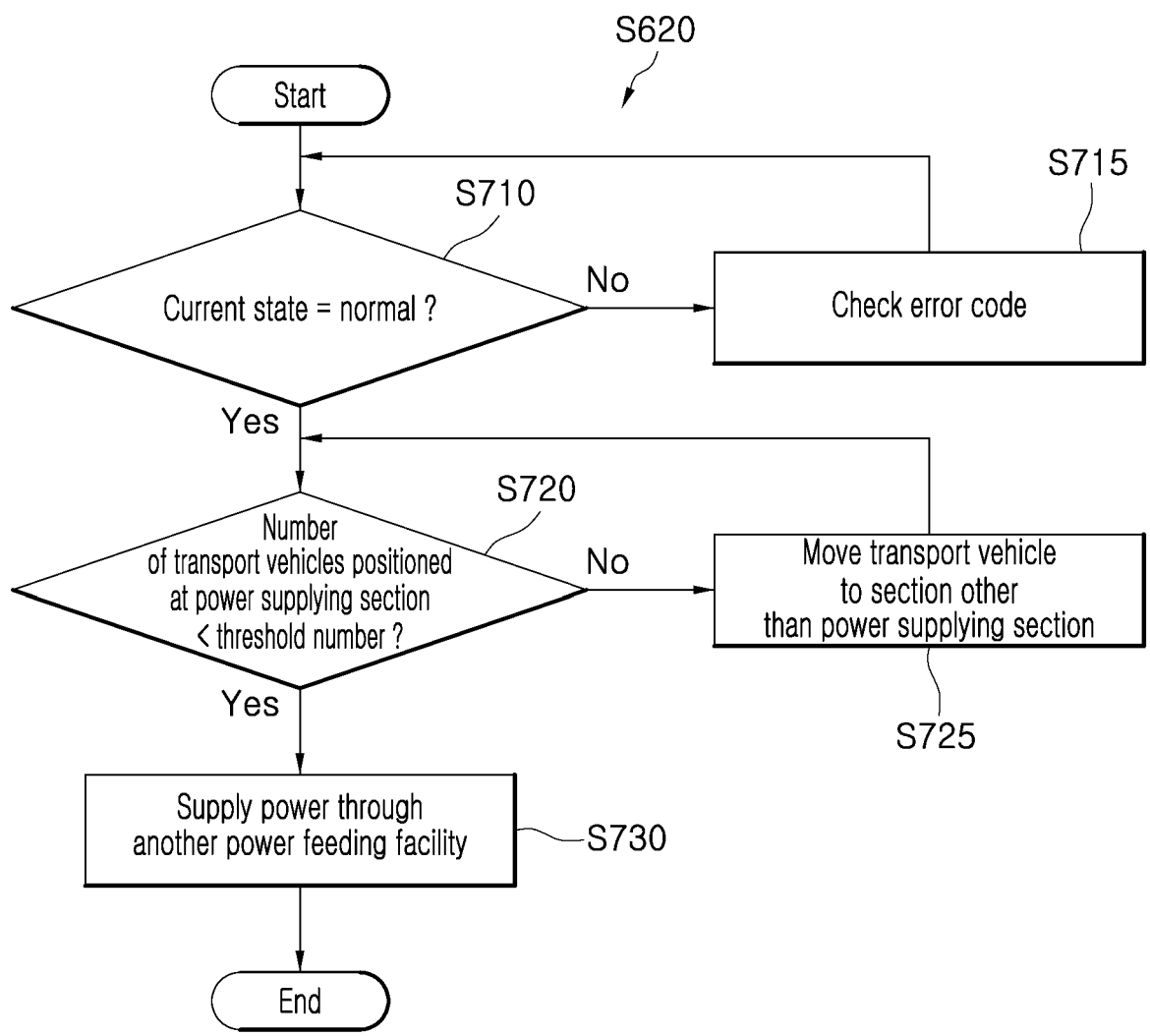
FIG. 7 is a flowchart illustrating a failover process in a software patch method of the power supplying facility according to the present disclosure.

FIG. 7 is a flowchart illustrating an embodiment of a failover process in a software patch method of the power supplying facility according to the present disclosure.

According to an embodiment of the present disclosure, the controlling process S620 performed so that power is supplied to the power supplying section of the power supplying facility 800 by another power supplying facility includes determining whether a current state of the power supplying facility 800 is normal (S710), checking an error code of the power supplying facility 800 when the current state of the power supplying facility 800 is abnormal (S715), comparing the number of the transport vehicles 20 positioned at the power supplying section and a threshold number when the current state of the power supplying facility 800 is normal (S720), controlling at least one of the transport vehicle 80 positioned at the power supplying section is moved to a section other than the power supplying section when the number of the transport vehicles 20 positioned at the power supplying section is equal to or greater than the threshold number (S725), supplying power to the power supplying section through the another power supplying facility 800 when the number of the transport vehicles 20 positioned at the power supplying section is less than the threshold number (S730).

In the transmitting process S630 in which data for the software patch is transmitted to the power supplying facility 800, the transceiver 610 transmits the data for the software patch to the power supplying facility 800. Here, a command for allowing the power supplying facility 800 to execute the software patch may be transmitted together with the data for the software patch. The power supplying facility 800 may execute the software patch when the data is received.

In the controlling process S640 in which the number of the transport vehicles 20 entering the power supplying section is controlled while the software patch is performed on the power supplying facility 800, when the vehicle control processor 630 detects that the software patch is performed on the power supplying facility 800, the vehicle control processor 630 may control the transport vehicle 20 so that the number of the transport vehicles 20 positioned at the power supplying section of the corresponding power supplying facility 800 is maintained within the threshold number.

According to an embodiment, the controlling process S640 in which the number of the transport vehicles 20 entering the power supplying section is controlled includes identifying a transport vehicle 20 entering the power supplying section (S810), comparing the number of the transport vehicles 20 being positioned at the power supplying section and a threshold number (S820), allowing the transport vehicle 20 to enter the power supplying section when the number of the transport vehicles 20 being positioned at the power supplying section is less than the threshold number (S830), and controlling the transport vehicle 20 to detour to a section other than the power supplying section when the number of the transport vehicles 20 to be positioned at the power supplying section is equal to or greater than the threshold number (S840).

Figure 8:
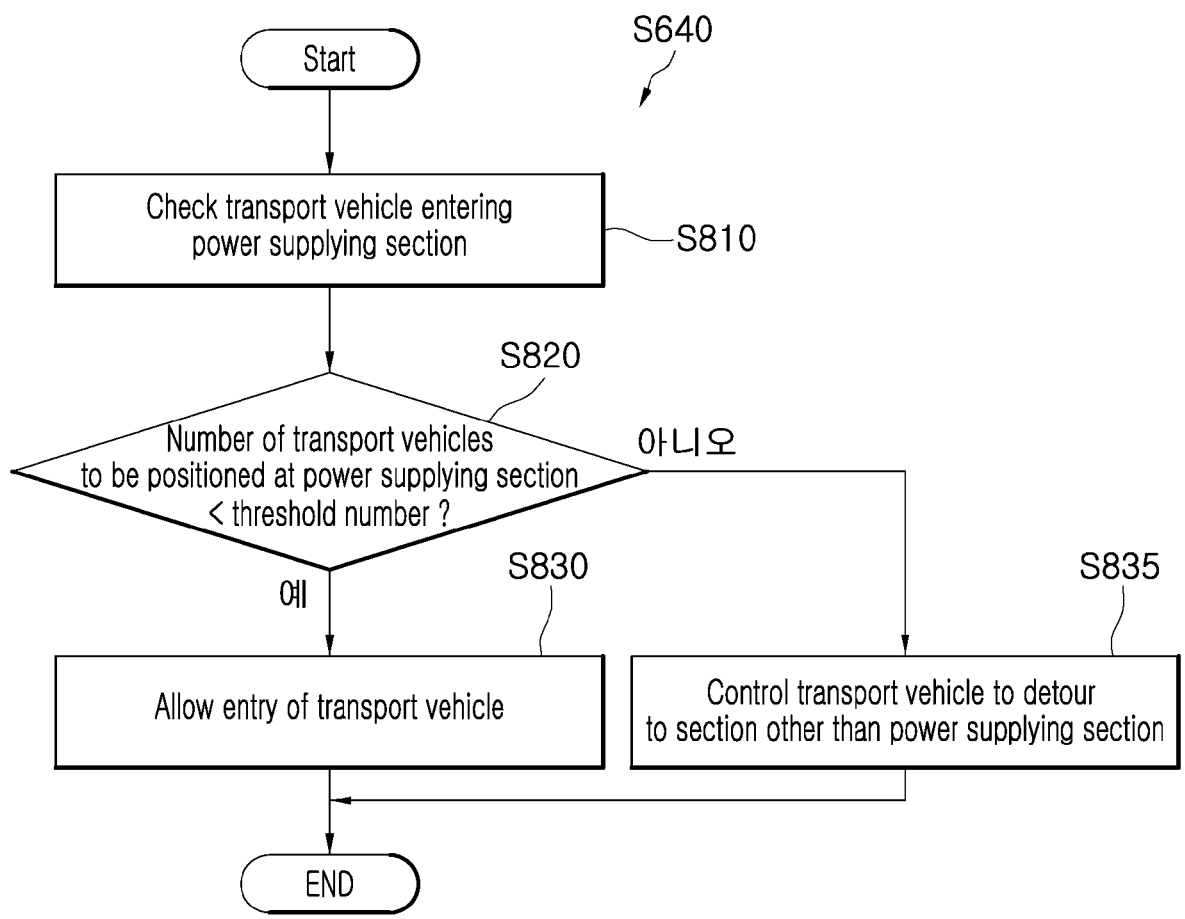
FIG. 8 is a flowchart illustrating a process of controlling the number of the transport vehicles that will enter a power supplying section in the software patch method of the power supplying facility according to the present disclosure.

As illustrated in FIG. 8, by controlling the number of the transport vehicles 20 that will enter the power supplying section of the power supplying facility 800 in which the software patch is in progress, a situation in which an overload occurs on the power supplying facility 800 that supplies power to a corresponding power supplying section through a failover may be prevented.

According to an embodiment of the present disclosure, the operating method of the controller device 600 for performing the software patch of the power supplying facility 800 may further include a receiving process in which information about a progress situation of the software patch from the power supplying facility 800 is received. The power supplying facility 800 executes the software patch and transmits information about the progress situation of the software patch to the controller device 600 in real time or periodically. Furthermore, the transceiver 610 may receive the information about the progress situation of the software patch from the power supplying facility 800. The information about the progress situation of the software patch may include a patch progress rate and remaining time.

According to an embodiment of the present disclosure, the operating method of the controller device 600 for performing the software patch of the power supplying facility 800 may further include a transmitting process in which the information about the progress situation of the software patch is transmitted to the manager device 500. The transceiver 610 may transmit the information about the progress situation of the software patch received from the power supplying facility 800 to the manager device 500. The information about the progress situation of the software patch may include the patch progress rate and the remaining time.

According to an embodiment of the present disclosure, the manager device 500 may output a progress rate of the software patch and a section in which the software patch is in progress based on the information about the progress situation of the software patch received from the controller device 600. The manager device 500 may output the progress rate of the software patch and the section in which the software patch is in progress through a display (not illustrated) so that the worker knows the progress situation of the software patch.

For example, in a map screen showing a transporting route of the manufacturing factory 1, the manager device 500 may display a first section in which the software patch is expected to be progressed, a second section in which the software patch is in progress, and a third section in which the software patch is completed in different colors.

Figure 10:
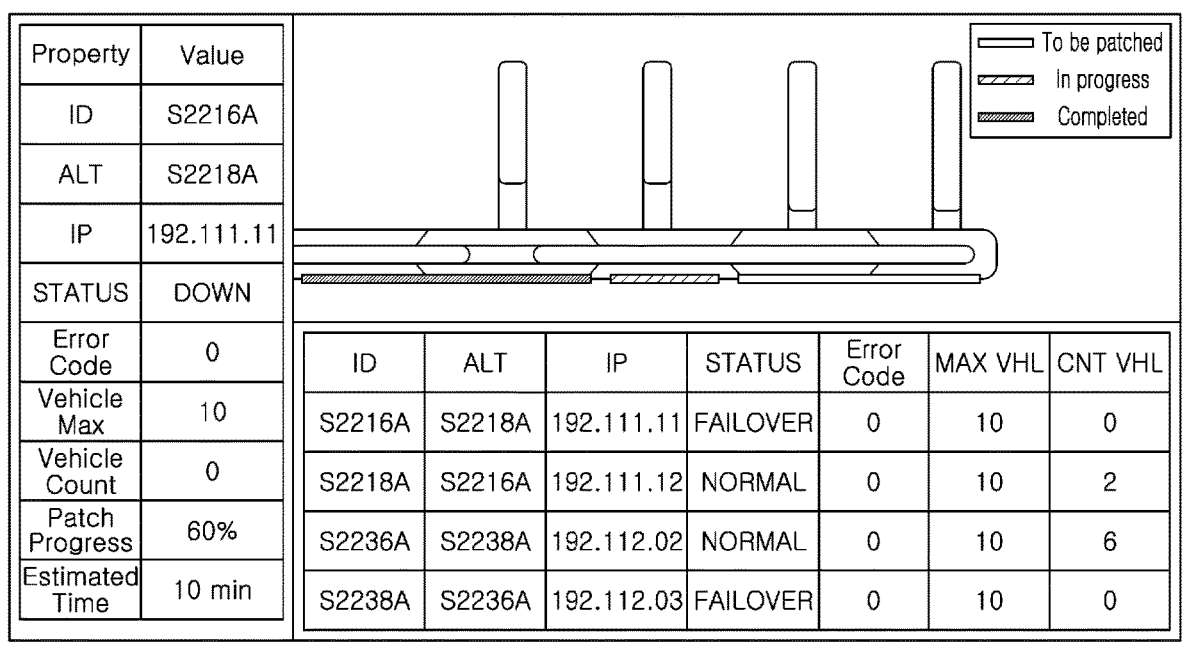
FIG. 10 is a view illustrating an example of a user interface screen output through a manager device according to the present disclosure.

For example, a user interface screen illustrated in FIG. 10 may be output to the manager device 500. As illustrated in FIG. 10, identification information (ID), alternative power supplying facility information (ALT), an IP address (IP), a status (STATUS), an error code (Error Code), the threshold number of vehicles (Vehicle Max), the number of current vehicles (Vehicle Count), a patch progress (Patch Progress), and an estimated time (Estimated Time) of each power supplying facility 800 may be displayed.

In addition, in the map screen which is positioned at an upper right end of FIG. 10 and which illustrates the transporting route of the manufacturing factory 1, the section in which the software patch is expected to be progressed, the section in which the software patch is in progress, and the section in which the software patch is completed may be displayed in different colors.

By the user interface screen output as illustrated in FIG. 10, the worker may check a current patch progress situation, a patch history, and a future patch schedule of the power supplying facility 800 at once.

Figure 9:
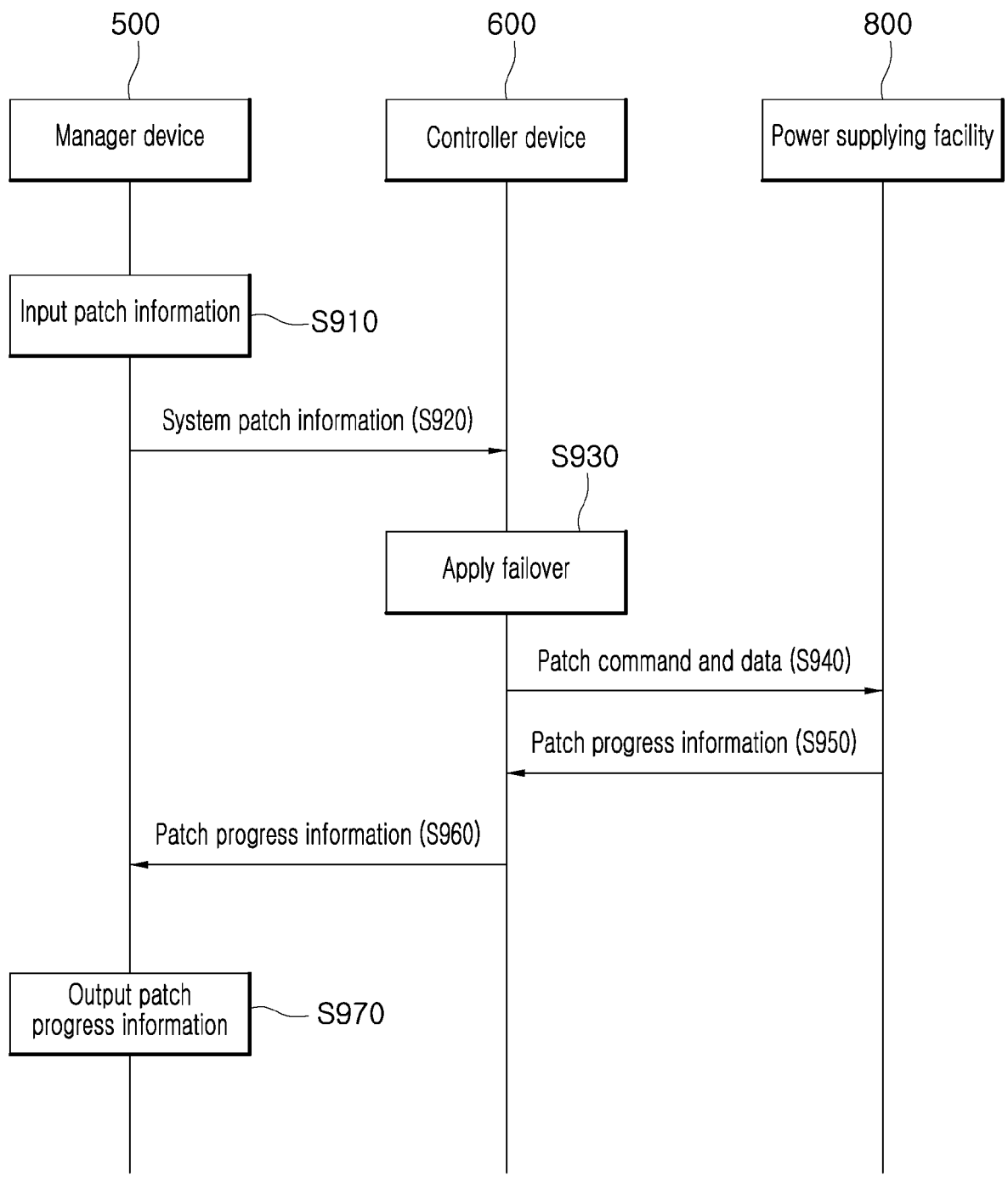
FIG. 9 is a view illustrating a signaling procedure for performing the software patch of the power supplying facility according to the present disclosure.

FIG. 9 is a view illustrating a signaling procedure between entities for performing the software patch of the power supplying facility 800 according to the present disclosure.

Referring to FIG. 9, information (command) and data about the software patch are input (received) to the manager device 500 in S910, and information about the power supplying facility 800 to which the software patch will be applied is transmitted to the controller device 600 in S920. The controller device 600 applies the failover so that power is applied to the power supplying section of the power supplying facility 800 to which the software patch will be applied by another power supplying facility in S930, and the command and the data for the software patch are transmitted to the power supplying facility 800 in S940. The power supplying facility 800 transmits progress information of the software patch to the controller device 600 in S950, and the controller device 600 transmits the software patch progress information to the manager device 500 in S960. The manager device 500 outputs patch progress information based on the received software patch progress information through the screen interface as illustrated in FIG. 10 in S970. Then, the software patch for the next scheduled power supplying facility 800 is performed, and a similar procedure may be performed.

The present exemplary embodiment and the accompanying drawings in this specification only clearly show a part of the technical idea included in the present disclosure, and it will be apparent that all modifications and specific exemplary embodiments that can be easily inferred by those skilled in the art within the scope of the technical spirit contained in the specification and drawings of the present disclosure are included in the scope of the present disclosure.

Therefore, the spirit of the present disclosure should not be limited to the described exemplary embodiments, and all things equal or equivalent to the claims as well as the claims to be described later fall within the scope of the concept of the present disclosure.

What is claimed is:

1. An operating method of a controller device for updating a software operating a power supplying facility that supplies power to a transport vehicle in a manufacturing factory using a software patch for the software, the operating method comprising:

receiving information about the power supplying facility to which the software patch is applied from a manager device;

controlling, instead of the power supplying facility, another power supplying facility to supply power to a power supplying section of the power supplying facility;

transmitting data for the software patch to the power supplying facility; and controlling a number of transport vehicles to be entered to the power supplying section less than a threshold number during a time when the software patch is installed on the power supplying facility.

2. The operating method of claim 1, wherein controlling the number of transport vehicles to be entered to the power supplying section comprises:

determining whether a current state of the power supplying facility is normal;

checking an error code of the power supplying facility when the current state of the power supplying facility is abnormal;

comparing the number of the transport vehicles positioned at the power supplying section and the threshold number when the current state of the power supplying facility is normal;

controlling at least one of the transport vehicle positioned at the power supplying section to move to a section other than the power supplying section when the number of the transport vehicles positioned at the power supplying section is equal to or greater than the threshold number; and supplying power to the power supplying section through the another power supplying facility when the number of the transport vehicles positioned at the power supplying section is less than the threshold number.

3. The operating method of claim 1, wherein controlling the number of transport vehicles to be entered to the power supplying section comprises:

identifying a transport vehicle entering the power supplying section;

comparing the number of the transport vehicles being positioned at the power supplying section and the threshold number;

allowing the transport vehicle to enter the power supplying section when the number of the transport vehicles being positioned at the power supplying section is less than the threshold number; and controlling the transport vehicle to detour to a section other than the power supplying section when the number of the transport vehicles to be positioned at the power supplying section is equal to or greater than the threshold number.

4. The operating method of claim 1, further comprising:

receiving information about a progress situation of the software patch from the power supplying facility.

5. The operating method of claim 4, further comprising:

transmitting the information about the progress situation of the software patch to the manager device.

6. The operating method of claim 5, further comprising:

displaying, by the manager device, a progress rate of the software patch and a section in which the software patch is in progress based on the information about the progress situation of the software patch received from the controller device.

7. The operating method of claim 6, further comprising:

displaying, by the manager device, a user interface including a first section in which the software patch is expected to be progressed, a second section in which the software patch is in progress, and a third section in which the software patch is completed in different colors on a map screen illustrating a transporting route of the manufacturing factory.

8. A controller device for installing a software patch of a power supplying facility that supplies power to a transport vehicle in a manufacturing factory, the controller device comprising:

a transceiver configured to:

receive information about the power supplying facility to which the software patch is applied from a manager device; and transmit data for the software patch to the power supplying facility, and a processor operatively coupled to the transceiver, and configured to:

control, instead of the power supplying facility, another power supplying facility to supply power to a power supplying section of the power supplying facility; and control a number of the transport vehicles entering the power supplying section less than a threshold number while the software patch is performed on the power supplying facility.

9. The controller device of claim 8, wherein the processor is configured to:

determine whether a current state of the power supplying facility is normal;

check an error code of the power supplying facility when the current state of the power supplying facility is abnormal;

compare a number of transport vehicles positioned at the power supplying section and the threshold number when the current state of the power supplying facility is normal; and control at least one of the transport vehicle positioned at the power supplying section to move to a section other than the power supplying section when the number of the transport vehicles positioned at the power supplying section is equal to or greater than the threshold number, and control the another power supplying facility to supply power to the power supplying section when the number of the transport vehicles positioned at the power supplying section is less than the threshold number.

10. The controller device of claim 8, wherein the processor is configured to:

check the transport vehicle entering the power supplying section, compare the number of the transport vehicles to be positioned at the power supplying section and the threshold number, allow the transport vehicle to enter the power supplying section when the number of the transport vehicles to be positioned at the power supplying section is less than the threshold number, and control the transport vehicle to detour to a section other than the power supplying section when the number of the transport vehicles to be positioned at the power supplying section is equal to or greater than the threshold number.

11. The controller device of claim 8, wherein the transceiver is configured to receive information about a progress situation of the software patch from the power supplying facility.

12. The controller device of claim 11, wherein the information about the progress situation of the software patch is transmitted to the manager device.

13. The controller device of claim 12,
wherein the manager device is configured to output a progress rate of the software patch and a section in which the software patch is in progress based on the information about the progress situation of the software patch received from the controller device.

14. The controller device of claim 13,
wherein, in a map screen illustrating a transporting route of the manufacturing factory, the manager device is configured to display a user interface including a first section in which the software patch is expected to be progressed, a second section in which the software patch is in progress, and a third section in which the software patch is completed in different colors.

15. A system for installing a software patch of a power supplying facility that supplies power to a transport vehicle in a manufacturing factory, the system comprising:
 a manager device configured to receive an input for managing a logistics system of the manufacturing factory, the manager device being configured to output information for managing the logistics system; and
 a controller device configured to control the power supplying facility which supplies power to the transport vehicle that transport an article in the manufacturing factory,
 wherein the controller device comprises:
 a transceiver configured to:
 receive information about the power supplying facility to which the software patch is applied from the manager device;
 transmit data for the software patch to the power supplying facility, and
 a processor operatively coupled to the transceiver, and configured to:
 control, instead of the power supplying facility, another power supplying facility to supply power a power supplying section of the power supplying facility; and
 control a number of the transport vehicles entering the power supplying section less than a threshold number while the software patch is performed on the power supplying facility.

16. The system of claim 15,
wherein the processor is configured to:
 determine whether a current state of the power supplying facility is normal;
 check an error code of the power supplying facility if the current state of the power supplying facility is abnormal;
 compare a number of the transport vehicles positioned at the power supplying section and the threshold number if the current state of the power supplying facility is normal;
 control at least one of the transport vehicle positioned at the power supplying section to move to a section other than the power supplying section if the number of the transport vehicles positioned at the power supplying section is equal to or greater than the threshold number; and
 control the another power supplying facility to supply power to the power supplying section if the number of the transport vehicles positioned at the power supplying section is less than the threshold number.

17. The system of claim 15,
wherein the processor is configured to:
 check the transport vehicle entering the power supplying section;
 compare the number of the transport vehicles to be positioned at the power supplying section and the threshold number;
 allow the transport vehicle to enter the power supplying section if the number of the transport vehicles to be positioned at the power supplying section is less than the threshold number; and
 control the transport vehicle to detour to a section other than the power supplying section if the number of the transport vehicles to be positioned at the power supplying section is equal to or greater than the threshold number.

18. The system of claim 15,
wherein the transceiver is configured to receive information about a progress situation of the software patch from the power supplying facility.

19. The system of claim 18,
wherein the information about the progress situation of the software patch is transmitted to the manager device.

20. The system of claim 19,
wherein the manager device is configured to output a progress rate of the software patch and a section in which the software patch is in progress based on the information about the progress situation of the software patch received from the controller device, and
in a map screen illustrating a transporting route of the manufacturing factory, the manager device is configured to display a user interface including a first section in which the software patch is expected to be progressed, a second section in which the software patch is in progress, and a third section in which the software patch is completed in different colors.

\* \* \* \* \*